March 28, 1961 T. N. LOWRY 2,977,420

TELEPHONE SUBSCRIBER'S SUPERVISORY CIRCUITS

Filed Dec. 24, 1959

INVENTOR
T. N. LOWRY
BY
S. E. Hollander
ATTORNEY 2,977,420

TELEPHONE SUBSCRIBER'S SUPERVISORY CIRCUITS

Terrell N. Lowry, Boonton, N.J., assignor to Bell Telephone Laboratories, Incorporated, New York, N.Y., a corporation of New York Filed Dec. 24, 1959, Ser. No. 861,910

18 Claims. (Cl. 179—18)

Figure 1:
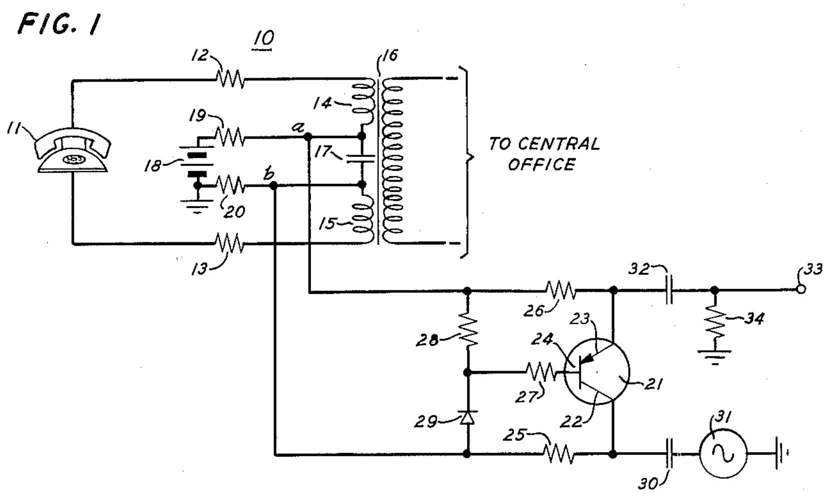

This invention pertains to supervisory circuits and more specifically to supervisory circuits utilized to determine the condition of subscriber subset loops in a telephone switching system.

It has been found advantageous in telephone switching systems to utilize remote line concentrator circuits to reduce the number of trunks connecting the subscribers to a central office. Such concentrator systems advantageously utilize a number of trunk circuits less than the number of subscriber subset loops to connect those subscriber loops to a central office thereby appreciably reducing the cost of materials. In such a system the subscribers are not directly connected to a central office, and switching equipment must be provided to make some of these connections.

In most telephone systems subscriber subset loops display unique direct-current conditions for the "on-hook" and "off-hook" states. Since the direct-current condition of the subscriber loop is indicative of the on-hook or off-hook state of the subset, knowledge of this condition may be utilized to determine the switching requirements of the subsets connected to such a remote concentrator. Since there are, however, no direct connections between the subsets and the central office in a remote line concentrator, equipment must be provided within the concentrator system itself, for monitoring the direct-current condition of the subscriber subset loop and for transferring the results of that monitoring to switching control circuitry which may reside in the central office.

In a subscriber subset loop, certain external influences tend to produce currents which may affect the measurement of the direct-current condition of the subset. For instance, fluctuating current in lines running parallel and adjacent to the wires of the subset loop creates magnetic fields which may induce currents in the subset loop to affect the condition thereof. For example, a subset loop may comprise a subscriber subset connected to a transformer by two wires which are physically adjacent and parallel. It is advantageous to maintain the wires of a subset loop in the parallel position since magnetic fields caused by currents in other adjacent conductors then induce equal but opposed currents in each wire of the subset. These induced currents, known as longitudinal currents, advantageously cancel each other. However, though they have no affect on the subset itself, which is substantially isolated from ground, the longitudinal currents do affect the voltage condition of the circuit in varying degrees around the loop. The changes in voltages occasioned by longitudinal currents may affect the measurement of direct-current voltages in an obviously undesirable manner. The circuits provided for determining the direct-current condition of a subset loop should be such that longitudinal currents have no affect on the results of the determination.

In determining the direct-current condition of a subscriber subset loop, the supervisory circuitry may be directly connected to the loop. The switching control circuitry, which directs the switching to trunks connected to the central office of all of a group of subsets, may include input circuitry which periodically scans the output of each of the supervisory circuits and relays the results of the scanning to the switching control circuitry. If the scanning circuitry operates at an audible frequency to examine the output of the supervisory equipment of each subset, the variation in impedance at the output of the equipment due to the examination thereof may furnish an audible signal capable of affecting the subscriber loop. In addition, in supervisory circuits utilizing interrogating equipment, if the interrogating signals are in the audible frequency range, a like result may obtain. It is obvious that any audible noise is undesirable in the subscriber loop since it affects the message received by the customer. It is therefore desirable that the supervisory equipment be arranged for eliminating the effect of audible noise so that interrogating signals of any frequency and scanning circuitry operating at any frequency may be utilized.

In any supervisory circuit it is obviously desirable that the interrogating signals utilized have no effect on the measurement of the condition of the subset loop for such a result limits the accuracy of the measurement. A supervisory circuit should thus be of a type wherein the measurement of the condition of the loop is independent of the interrogating signals and various interrogating signals may be used interchangeably.

A change of direct-current condition in a customer subset loop results both when changing from on-hook to off-hook and vice-versa. Since different switching functions are required by these changes, it is desirable for the supervisory circuitry to be able to signal the type of change to the switching control circuitry which can then make the switching changes necessary. To this end it is desirable that a supervisory circuit provide unique output signals indicative of the individual changes of state in a subset loop. If the supervisory equipment is capable of providing such unique signals, certain memory equipment necessary in the switching control circuitry to determine a change of condition can be eliminated thereby reducing complication and cost in the system.

When supervisory equipment capable of providing change-of-state information is utilized in remote line concentrator systems with scanning equipment, it should be capable of registering a change of state for a period sufficient to allow the scanning equipment to interrogate all of the subset loops. Without such capability, a change-of-state signal might be missed by the scanner. It is therefore desirable that the supervisory equipment be capable of furnishing change-of-state outputs which persevere for at least one scanning cycle.

An especially desirable attribute of any circuit providing two or more different output signals relates to the ability of the circuit to provide signals which are clearly distinguishable, one from the other. For example, "on" and "off" signals may be distinguished by circuitry utilizing less expensive elements of wider tolerance than that required to distinguish between "on" signals of various levels. Therefore, supervisory circuits providing easily distinguishable output signals are desirable. It is also desirable where the original states measured may be easily confused that the supervisory circuit be capable of accenting any differences therebetween and furnishing clearly unique output signals indicative thereof.

In any telephone switching system utilized to serve a large number of customers, the cost of the various circuits included therein is of prime importance. Therefore, the number and cost of elements in any supervisory circuit adapted for use in a telephone system must be held to a minimum. This may be more easily accomplished in subscriber subset supervisory or monitoring circuits utilizing equipment displaying wide tolerances.

In view of the foregoing it is an object of this invention to provide an improved supervisory circuit for determining the direct-current condition of a subscriber subset loop in an alternating-current coupled remote line concentrator.

It is another object of this invention to render supervisory circuits substantially indifferent to longitudinal currents in the subset loop.

It is a further object of this invention to eliminate any effect by the interrogating circuitry on the audible condition of the subscriber subset loops.

Another object of this invention is to improve supervisory circuits so that they may utilize interrogating signals of a large range of frequencies and may be used with various utilization circuits having audio operational frequencies.

An additional object of this invention is to prevent the interrogating signals from having a deleterious effect on the measurement of the direct-current condition of the subset loops attached thereto.

A furher object of one aspect of this invention is to provide supervisory circuitry capable of signaling change-of-state information in a subscriber subset loop.

Another object of this invention is to provide unique and clearly distinguishable output signals from a supervisory circuit indicative of the various conditions and changes of condition in subscriber subset loops.

It is a further object of this invention to utilize a minimum number of elements in improved supervisory circuits used in alternating-current coupled line concentrators.

Another object of this invention is to provide inexpensive supervisory circuits for alternating-current coupled line concentrators utilizing substantially inexpensive elements having liberal tolerance values.

Briefly, the foregoing objects are accomplished in accordance with aspects of this invention by a four-terminal supervisory circuit which has two of its terminals connected across the subscriber loop to measure the direct-current condition and operate a gate in response thereto and the other two terminals connected to alternating-current input and output means. The measuring terminals are connected to the loop at the battery feed resistors thereof. These resistors are advantageously connected to opposite terminals of the loop supply battery and are of equal values so that longitudinal currents in the loop produce the same voltage drop across each. By connecting the measuring circuit in this manner both terminals thereof shift an equal amount in the same amplitude direction upon the induction of any longitudinal currents and the measuring portion of the supervisory circuit examines the direct-current voltage condition of the loop irrespective to the longitudinal currents. Alternating-current signals are applied at the input terminal of the gate from a source connected thereto and pass to the output for predetermined conditions of the gate thus enabling a direct-current voltage condition in the subset loop to control an output which may be utilized in alternating-current coupled remote line concentrators.

In contrast to prior art circuits utilizing diode gates wherein interrogating signals may display appreciable effect on measurement and the capacitive effect of the diode may cause leakage, the circuits of this invention utilize transistors for measuring the direct-current condition of the subscriber circuit and for gating a signal in response to the results of the measurement thereof. In each embodiment substantially balanced impedances are provided in the measuring arms connecting the transistor to the battery feed resistors to maintain the aforementioned indifference to longitudinal currents in the supervisory circuit. These balanced impedances are also advantageously such as to substantially decouple the interrogating signal source from the subscriber loop so that input and output equipment operating at frequencies including audio frequencies may be utilized.

A first embodiment of the invention utilizes a Zener diode element for precision control of the biasing voltages applied to the transistor gating element to provide accurate "on" and "off" operation depending on the direct-current condition of the subset loop. The diode acts as an arm of a voltage divider having a preset value and advantageously controls current flow to the transistor to a more precise degree of accuracy than is possible with a transistor alone to give easily distinguishable "on" and "off" output signals.

In a second similar embodiment of the device a transistor is utilized with a Zener diode biasing control element as a shunting gate for diverting an alternating-current interrogating signal from an output path for a predetermined direct-current voltage conditions of the subscriber loop. A capacitor of a requisite value is provided at the base of the transistor to close a path to ground for the interrogating signal upon the saturation of the gating transistor. The impedance elements of the circuit are advantageously arranged such that for the on-hook state of the subset the transistor is biased in the amplifying state presenting a high impedance in parallel with the output so that no signals are diverted therefrom.

Another embodiment of the invention utilizes a capacitor element connected across the battery feed resistors of a subset loop in a manner appropriate to bias the transistor gate, also connected thereacross, to produce change of direct-current state indications. Advantageous use is made of the fact that the transistor is a three-terminal gating element and that the biasing on all three of the terminals determines the operational state thereof to produce the change indications. The capacitor is positioned, and with circuit resistance has a time constant, such that the charge thereon due to any steady-state condition is maintained upon a change of subset state for a period sufficient to produce a unique change-of-condition indication. The capacitor maintains the bias between two terminals of the transistor gate at the prior steady-state value while the bias between the other measuring terminals changes with the change of condition in the subset loop. The realignment of biasing values produces temporary conditions of saturation and open circuit, indicative of changes in the subset condition in one direction or the other. Various configurations are adapted to provide amplified output signals and non-amplified output signals, and to arrange the order of appearance of the plurality of different output signals in a manner for easy discrimination.

A feature of this invention relates to the use of a transistor as a gating element to provide alternating-current output signals indicative of the direct-current condition of a subscriber subset loop.

Another feature of this invention in one embodiment thereof, relates to the use of a Zener diode measuring element utilized to control the biasing of a transistor gating device to provide accurate measurement of the direct-current voltage condition of a subscriber subset loop.

An additional feature of this invention relates to the connection of transistor supervisory circuits utilizing balanced elements in a manner to eliminate the effect of longitudinal currents in a subset loop on the measurement of the direct-current voltage conditions thereof.

Another feature of this invention relates to the use of a transistor as an interrogating and gating element for a subscriber subset loop whereby interrogating signals have no effect on the measuring accuracy of the circuitry controlling the gate.

A further feature of this invention in one embodiment thereof relates to the use of a capacitor for biasing a transistor gate to provide change-of-state output indications in supervisory circuits.

Another feature of this invention relates to the utilization of a transistor gate with an independent source of alternating-current interrogating pulses in a manner whereby the gate provides output signals having greater discrimination ratios than the ratio between the signal conditions of the subscriber loop.

Figure 2:
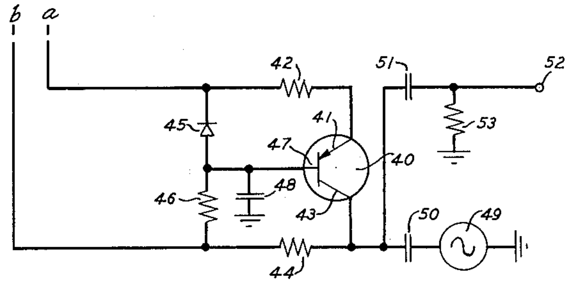
Figure 3:
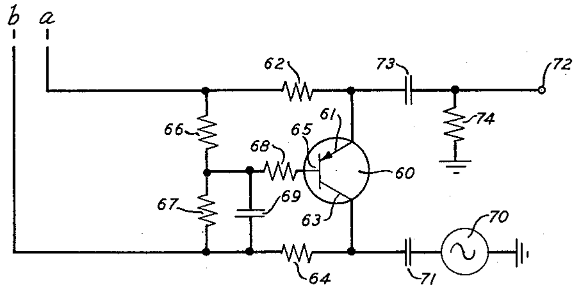

These and other objects and features of this invention will be better understood upon consideration of the following detailed description and the accompanying drawing, in which:

Fig. 1 is a schematic representation of an alternating-current coupled subscriber subset loop including a supervisory circuit utilized to measure the direct-current condition thereof, in accordance with one specific embodiment of my invention. The supervisory circuit employs a transistor gating element having its base-collector voltage controlled by a Zener diode element and utilizes an alternating-current signaling source connected to the collector of the transistor to provide an output at the emitter indicative of the direct-current voltage condition of the subset loop;

Fig. 2 is a schematic diagram illustrative of a supervisory circuit employing a transistor gating element to provide for a signal a shunt path or a high impedance in parallel with an output terminal, depending on the direct-current voltage condition of the subscriber subset loop; and Fig. 3 is a schematic diagram illustrative of a subscriber subset loop monitoring circuit utilizing a transistor gating element wherein the biasing thereof is controlled by a capacitor to provide output signals indicative of change-of-state and steady-state direct-current voltage conditions in the subset loop.

Referring now to Fig. 1, there is shown an alternating-current coupled subscriber subset loop 10 having a subscriber subset 11, connected by two resistors 12 and 13 to windings 14 and 15 of a transformer 16. The windings 14 and 15 are connected by a capacitor 17, interposed therebetween, which is advantageously such as to provide a shunt path for ringing and voice signals to by-pass a subset energization circuit. The energization circuit includes a battery 18 and equal-valued resistors 19 and 20 which connect the battery 18 to the transformer 16 to supply power for operating the subset 11.

A point *a* at one terminal of the resistor 19 and a point *b* at one terminal of the resistor 20 are to be noted. Longitudinally induced currents will have substantially no effect on the voltage between points *a* and *b*. The wires connecting the subset 11 to the transformer 16 are maintained parallel and adjacent so that they lie in the same magnetic fields. If longitudinally induced currents are present, they then flow in opposite directions around the loop through the resistors 19 and 20. Thus the voltages at points *a* and *b* rise or fall by the same amount due to longitudinal currents, and the voltage difference between the two points is maintained constant.

In the on-hook condition the circuit path through the subset 11 is substantially open and no current flows through the transformer 16 or the resistors 12 and 13. Thus, the direct-current voltage between the points labeled *a* and *b* on the diagram is advantageously of a first predetermined value equal to the voltage supplied by the battery 18, neglecting leakage at the capacitor 17.

On the other hand, when the subscriber at subset 11 lifts the handset and goes off-hook, current flows around a loop including the battery 18, the resistor 19, the winding 14, the resistor 12, the subset 11, the resistor 13, the winding 15, and the resistor 20. The flow of current therethrough provides a voltage drop across the resistors 19 and 20 and thus a reduction in the direct-current voltage between the points *a* and *b*.

Connected between the points *a* and *b* to act as a gate in response to the direct-current voltage condition therebetween is a transistor 21 having a collector terminal 22, an emitter terminal 23, and a base terminal 24. The collector terminal 22 is connected by a resistor 25 to the point *b* while the emitter terminal 23 is connected by a resistor 26 to the point *a*. The base terminal 24 is connected by a resistor 27 to a voltage divider circuit including a resistor 28 connected to point *a* and a Zener diode 29 connected to point *b*.

In one specific illustrative embodiment, the foregoing elements may take the following illustrative values:

| | | |
|---|---|---|
| Resistors **12** and **13** | ohms | 250 |
| Resistors **19** and **20** | do | 850 |
| Battery **18** | volts | 27 |
| Resistors **26** and **27** | ohms | 20K |
| Resistor **28** | do | 50K |
| Resistor **25** | do | 80K |
| Subset **11** (off-hook) | do | 500 |
| Breakdown level of Zener diode **29** | volts | 13.5 |
| Transistor **21** | | 2N414 |

These elements are advantageously such that for the on-hook and off-hook conditions of the subset 11, the direct-current voltages between points *a* and *b* approach approximately 27 volts and 10 volts, respectively. The Zener diode element 29 provides a voltage drop midway between the aforementioned values for controlling the biasing between the base and collector terminals 24 and 22 of the transistor 21. Thus, in the off-hook condition, the voltage across the diode 29 is insufficient to allow current flow therethrough. With no current flow through the diode 29, the emitter terminal 23 and the base terminal 24 are at the same potential, approximately 10 volts higher than the collector terminal 22. Since the base terminal 24 must have a lower voltage than the emitter terminal 23 to operate the transistor 21, transistor 21 remains nonconducting. On the other hand, in the on-hook condition of the circuit 10, sufficient voltage appears across the diode 29 to cause it to operate with a 13.5-volt drop and supply current for advantageously placing the PNP transistor 21 in the saturated state. Thus the diode 29 causes the transistor 21 to operate in two conditions which depend on the direct-current voltage condition of the subset loop 10. Were the diode 29 replaced with a linear element such as a resistor, the transistor 21 would have no "off" state and would continually operate as an amplifier producing indistinct output signals.

Connected to the collector terminal 22 of the transistor 21 by a capacitor 30 is a source of alternating-current signals 31. Connected to the emitter terminal 23 by a capacitor 32 is an output terminal 33 separated from ground by a resistor 34.

When the subset 11 is on-hook and the transistor 21 in a saturated condition, signals provided by the alternating-current source 31 pass through the transistor 21 to the output terminal 33 where they may be utilized in any of a number of well-known manners. On the other hand, when the subset 11 is off-hook, the transistor 21 is biased so as to be non-conducting and no output signals appear at the terminal 33. It is to be noted that the output signals indicative of the two operational states of the subset 11 are easily distinguished since they are "on" and "off" signals.

It is by the unique use of a three-terminal device, such as transistor 21, as a measuring and gating element, that a plurality of novel results are realized. The arrangement of a transistor and a non-linear impedance element is such that the voltage at two points is adapted to control the biasing of three terminals. By connecting the collector terminal 22 and the emitter terminal 23 across the points *a* and *b*, the voltage between those terminals 22 and 23 is made to vary with the variance in direct-current potential of the loop. At the same time the Zener diode 29 connected between the base terminal 24 and the collector terminal 22 measures the voltage between the points *a* and *b* and exerts *"on"* and *"off"* control of the flow of current to the transistor 21 depending on which well-defined area that voltage lies in.

The control by the diode 29 is such that when a change of condition does take place the transistor 21 is operated in the middle of a limiting state, i.e., saturation or cut-off, so that further changes of voltage in either direction within wide limits have no further effect on any output of the gate. In this manner liberal tolerance elements are capable of producing close tolerance results, variations in loop or interrogating voltages may take place without adverse results on output signals, which output discrimination ratios are available, and various other advantages are obtained.

As is clearly apparent, the circuit of Fig. 1 utilizes a minimum number of elements, those used being relatively inexpensive. For instance, the transistor 21 may have very liberal tolerance values because the Zener diode 29 controls the turn-off thereof, while the Zener diode 29 need have a breakdown value only approximating 13.5 volts. Use of liberal tolerance elements clearly reduces circuit cost.

In addition, as explained supra, the transistor 21 operates in the nonconducting and saturated conditions. The biasing values provided by the Zener diode 29 and other circuit elements are such that wide variance may occur in the values of the voltages at the various terminals without causing the transistor 21 to shift to a different operating condition. For instance, the off-hook voltage between points *a* and *b* may become as high as 13 volts and the transistor will remain inoperative, while the on-hook voltage may decrease to approximately 18 volts before the transistor 21 goes out of saturation. Since the signals indicative of operation in these two states do not vary for variation in biasing within the states, wide latitude in subset circuit design is possible and elements of larger tolerance may be used in the supervisory circuit.

The fact that such wide voltage excursions do not effect a change in output also renders the measuring function of the circuit independent of the interrogating signals furnished by the source 31, illustrative examples of which varied in specific circuits from 0.1 to 2 volts, though higher values are usable without undesirable results.

The circuit of Fig. 1 additionally provides substantial decoupling of the supervisory circuitry from the subset loop so that source 31 may furnish signals of audio frequency and scanning equipment, not shown, connected to output terminal 33 may operate at audio frequencies without affecting the subset loop 10 and thus the signals received at the subset 11 by a customer. It is to be noted that the resistors 25 and 26 form voltage divider networks with the resistors 19 and 20 and that the values thereof are advantageously such that a very small percentage of any signal at the source 31 or the terminal 33 will appear across the resistors 19 and 20. In addition, the subset loop impedance at audio frequencies is so much higher than the impedance of the capacitor 17 that any audio signals appearing at the subset loop 10 are shunted by the capacitor 17 back into the battery circuit and have no effect on the subset loop 10. The circuit of Fig. 1 may thus utilize interrogating frequencies in the audio range and may be connected to output circuitry operating at audio frequencies.

Referring now to Fig. 2, there is shown a second supervisory circuit for connection at points *a* and *b* of the subset loop 10 described in Fig. 1. This supervisory circuit includes a transistor 40 having an emitter terminal 41 connected by a resistor 42 to the point *a*, and a collector terminal 43 connected by a resistor 44 to the point *b*. A Zener diode 45, which may advantageously have a 6-volt breakdown level, is connected to point *a* and to a resistor 46 which is in turn connected to the point *b*. A base terminal 47 of the transistor 40 is connected between the diode 45 and the resistor 46 and to ground by a capacitor 48. A source of alternating-current signals 49 is connected by a capacitor 50 to the emitter terminal 43 and thence by a capacitor 51 to an output terminal 52. The output terminal 52 is connected to ground by a resistor 53.

In operation, in the on-hook state, the voltage between the base terminal 47 and the point *a* is maintained at approximately 6 volts by the Zener diode 45 so that with an on-hook voltage of 27 volts between points *a* and *b*, the transistor 40 operates in the linearly amplifying condition presenting a high impedance in shunt with the output circuit including the output terminal 52 and the resistor 53. Therefore, in the on-hook condition, signals furnished by the generator 49 are transferred by the capacitors 50 and 51 directly to the output terminal 52. On the other hand, when the voltage between points *a* and *b* is reduced to approximately 10 volts, as when the subset 11 goes off-hook, the collector terminal 43 becomes more positive forcing the transistor 40 into saturation to provide a low impedance path in shunt with the output represented by the terminal 52 and the resistor 53. In such a case, the signal from the generator 49 is shunted through the base terminal 47 of the transistor 40 to ground through the capacitor 48 which is advantageously of such a value as to offer substantially no impedance to the transfer of signals of the frequency provided by the generator 49.

In this circuit, as in the circuit of Fig. 1, substantial indifference to longitudinal voltage changes is provided by the connection of the circuit at points *a* and *b* of the subset loop 10. In addition, the circuit provides good discrimination ratios between the output signals representative of the two direct-current conditions of the loop 10 by providing no output during the off-hook state and an output signal during the on-hook state. In a like manner to the circuit of Fig. 1, the circuit of Fig. 2 provides efficient precise measurement of direct-current voltage conditions within the subset loop 10 by the use of a comparatively inexpensive circuit utilizing comparatively inexpensive elements of liberal tolerance, for example, the transistor 40 and the Zener diode 45.

As may be noted from the following values given as illustrative of one arrangement of Fig. 2, substantial decoupling is realized by the ratio of the measuring resistors 42 and 44 to the battery-feed resistors 19 and 20.

| | | |
|---|---|---|
| Resistor 42 | ohms | 20K |
| Resistor 44 | do | 62K |
| Resistor 46 | do | 47K |
| Resistor 53 | do | 1.5K |
| Capacitor 48 | μf | .05 |
| Capacitor 50 | μμf | 150 |
| Capacitor 51 | μμf | 750 |
| Zener diode 45 | volts | 6 |
| Transistor 40 | | 2N414 |

Referring now to the circuit of Fig. 3, there is shown a three-mode transistor supervisory gate also adaptable for connection between the points *a* and *b* of the loop 10. This circuit offers the advantage of furnishing outputs indicative of changes of voltage condition within the loop 10 in addition to an output indicative of the steady-state levels. Such change-of-state signals allow the elimination of memory circuitry in the switching control and thus reduce both complication and expense. The circuit of Fig. 3 comprises the PNP transistor 60 which has an emitter terminal 61 connected by a resistor 62 to the point *a* of the circuit 10 described in Fig. 1, a collector terminal 63 connected by a resistor 64 to the point *b* of the circuit 10, and a base terminal 65. A voltage divider comprising a resistor 66 and a resistor 67 is connected between the points *a* and *b* to provide biasing potentials for the base terminal 65, connected therebetween by a resistor 68. Connected in shunt with the resistor 67 is a capacitor 69. A generator 70 is connected by a capacitor 71 to the collector 63, and an output terminal 72 is connected by a capcitor 73 to the emitter 61 and by a resistor 74 to ground.

The elements of the circuit of Fig. 3 may advantageously take the following illustrative values:

| | | |
|---|---|---|
| Resistor 62 | ohms | 3.9K |
| Resistor 64 | do | 47K |
| Resistor 66 | do | 10K |
| Resistor 67 | do | 150K |
| Resistor 68 | do | 47K |
| Resistor 74 | do | 10K |
| Capacitor 69 | μf | 25 |
| Capacitor 71 | μf | .01 |
| Capacitor 73 | μf | .01 |
| Transistor 60 | | 2N414 |

The circuit of Fig. 3 is adapted to provide three levels of output indicative respectively of a change of state from on-hook to off-hook, a steady-state condition, and a change of state from off-hook to on-hook. Assuming for illustration that the circuit 10 of Fig. 1 is in the on-hook condition, the resistor 66 and the resistor 67 of the voltage divider network are advantageously of such values that most of the voltage between points *a* and *b* in a steady-state condition appears across the resistor 67, and the capacitor 69 in shunt therewith. In this condition the transistor 60 amplifies signals from the generator 70. It is to be noted that the amplification of a signal from the generator 70 to the output terminal 72 through the amplifying transistor 60 is actually inverse in character. The resistance of the resistor 64 is of a value compared to that of the resistor 62 such that a large voltage swing at the collector terminal 63 produces a relatively small voltage swing at the emitter terminal 61.

When subset 11 goes off-hook and the voltage between points *a* and *b* drops from 27 volts to approximately 10 volts, a charge corresponding to 27 volts is maintained on the capacitor 69 for a short period of time. During this period the base terminal 65 becomes more positive than the emitter terminal 61, and the transistor 60 is turned off so that no output is provided from the generator 70 to the output terminal 72. This signal (no output) is maintained until the capacitor 69 discharges to allow the base terminal 65 to become more negative than emitter terminal 61 and once again operate the transistor 60 in the amplifying condition. The discharge time constant is determined primarily by the value of the capacitor 69 and the resistor 66.

After a sufficient period of time to allow the scanning equipment, not shown, connected at the output terminal 72 to scan all of the subset output terminals to indicate the condition thereof, the capacitor 69 discharges to substantially the 10-volt level maintained in the off-hook condition between points *a* and *b*. In this condition, the transistor 60 operates to amplify signals provided by the generator 70 for transfer to the output terminal 72. The same amplifying condition is realized when the transistor 60 is in the steady-state off-hook condition as in the steady-state on-hook condition.

On the other hand, when changing state from the off-hook to the on-hook condition, the voltage between points *a* and *b* changes from approximately 10 volts to approximately 27 volts. For a period of time sufficient to allow the scanning operation, the charge on the capacitor 69 remains at substantially 10 volts causing the transistor 60 to saturate and transfer signals undiminished from the generator 70 to the output terminal 72. In this manner, signals indicative of the two changes-of-state and of steady-state conditions are available to the output terminal.

It is to be noted that these signals are arranged in a manner facilitating discrimination therebetween. For instance, a steady-state condition in the loop 10 produces an inversely amplified signal at the output terminal 72, a change in one direction causes the output signals to be reduced to nothing, and a change in the other direction causes the output signals to be increased to substantially all of that produced by the generator.

On the other hand, the circuit may be arranged such that actual amplification of signals in the forward direction takes place in the steady-state condition, but it is to be noted that this arrangement provides signals which are less easily discriminated between. Such an arrangement may be realized by connecting generator 70 by the capacitor 71 to the emitter terminal 61 and the output terminal 72 by the capacitor 73 to the collector terminal 63. Steady-state operation then provides an amplified output of a first high value, a change in one direction provides an output of a lesser value due to saturation of transistor 60, and a change in the other direction provides substantially no output. It is to be noted that the change-of-state signals vary output amplitude in the same sense and, therefore, are harder to discriminate between.

It is to be understood that the above-described arrangements are illustrative of the applications and the principles of this invention. Numerous other arrangements may be devised by those skilled in the art without departing from the spirit and scope of the invention.

What is claimed is:

1. A supervisory circuit for determining the condition of a subscriber subset loop comprising in combination a subscriber subset loop having a battery, a subscriber subset, and a first and a second conductor joining said battery to said subset; a source of interrogating pulses; output means; a transistor connected to said source and said output means for gating pulses from said source to said output means in response to the condition of said transistor, said transistor having three terminals; means connecting one of said terminals of said transistor to said first conductor; means connecting a second of said terminals to said second conductor; and means connecting the third one of said treminals to both of said conductors for operating said transistor in response to the voltage between said first and said second conductors.

2. A supervisory circuit as in claim 1 including first and second equal valued resistors connected by said first and second conductors, respectively, to said battery and said subset; and wherein said means connecting said one of said terminals of said transistor to said first conductor comprises a third resistor, said means connecting said second of said terminals to said second conductor comprises a fourth resistor, and said means connecting said third one of said terminals to both of said conductors comprises a nonlinear element.

3. A supervisory circuit as in claim 2 wherein the value of said first and said second resistors is small compared to the values of said third and said fourth resistors.

4. A supervisory circuit as in claim 1 wherein said last-mentioned means includes a Zener diode connecting said third one of said terminals to one of said conductors.

5. A supervisory circuit as in claim 4 wherein said source is connected to one of said two terminals of said transistor and said output means is connected to the other of said two terminals.

6. A supervisory circuit as in claim 4 further comprising a source of reference potential and a capacitor connecting said third one of said terminals to said source of reference potential.

7. A supervisory circuit as in claim 6 wherein said source and said output means are connected to the same one of said two terminals of said transistor.

8. A supervisory circuit as in claim 1 wherein said last-mentioned means includes a capacitor connecting said third one of said terminals to one of said conductors.

9. A telephone subset loop monitoring circuit comprising a source of interrogating pulses; output means; a transistor connected to said source and said output means for controlling the flow of information therebetween, said transistor having a first, a second, and a third terminal; and means for operating said transistor in response to the condition of the subset loop including first means connecting said first terminal to a first wire of the loop, second means connecting said second terminal to a second wire of the loop, and nonlinear voltage divider means connecting said third terminal to the first and second wires of the loop.

10. A monitoring circuit as in claim 9 wherein said voltage divider means comprises a Zener diode and a resistor connecting said third terminal to the first and the second wires, respectively.

11. A monitoring circuit as in claim 10 further comprising a source of reference potential and a capacitor connecting said third terminal to said source of reference potential.

12. A monitoring circuit as in claim 9 wherein said voltage divider means comprises a first resistor connecting said third terminal to the first wire, and a second resistor and a capacitor connected in parallel and connecting said third terminal to the second wire.

13. A supervisory circuit for determining the condition of a subscriber subset loop comprising a transistor having first, second, and base electrodes, said first electrode being connected to one wire of the subset loop and said second electrode being connected to the other wire of the subset loop, voltage divider means connected across the two wires of the subset loop, means connecting said base electrode to said voltage divider means, a source of interrogating signals connected to said transistor, and an output circuit connected to said transistor for receiving said interrogating signals dependent on the state of said transistor, said voltage divider means including means for at least initially determining the voltage at said base electrode at a predetermined value upon a change of state in the subset loop.

14. A supervisory circuit in accordance with claim 13 wherein said voltage divider means includes a pair of resistors connected between the wires of the subset loop and a capacitor in parallel with one of said resistors, said base electrode being connected to the junction point between said resistors.

15. A supervisory circuit in accordance with claim 13 wherein said voltage divider means includes a resistor and a Zener diode connected between the wires of the subset loop, said base electrode being connected to the junction point between said resistors and said Zener diode.

16. A supervisory circuit for determining changes-of-state of a subscriber subset loop comprising a transistor having first, second, and base electrodes, first resistance means connecting said first electrode to one wire of the subset loop and second resistance means connecting said second electrode to the other wire of the subset loop, said first resistance means being smaller than said second resistance means, voltage divider means connected across the wires of the subset loop and comprising third and fourth resistance means and a capacitor in shunt with said fourth resistance means, said third resistance means being smaller than said fourth resistance means, a source of interrogating signals connected to said second electrode and an output circuit connected to said first electrode, whereby conduction of said interrogating signals through said transistor is dependent on the voltages applied to said first and second electrodes by the subset loop and, on change of condition of the subset loop, also on the bias applied to said base electrode by the charge on said capacitor.

17. A supervisory circuit for determining the condition of a subscriber subset loop comprising a transistor having first, second, and base electrodes, a first resistance means connecting said first electrode to one wire of the subset loop, a second resistance means connecting said second electrode to the other wire of the subset loop, voltage divider means connected across the wires of the subset loop, said voltage divider means including third resistance means connecting to the one wire and a Zener diode connected to the other wire of the subset loop, fourth resistance means connecting said base electrode to the junction point between said third resistance means and said Zener diode, a source of interrogating signals connected to said second electrode and an output circuit connected to said first electrode, whereby conduction of said interrogating signals through said transistor to said output circuit is dependent on the biasing of said first, second and base electrodes due to the potentials on the wires of the subset loop.

18. A supervisory circuit for determining the condition of a subscriber subset loop comprising a transistor having first, second, and base electrodes; a first resistor connecting said first electrode to one wire of the subset loop; a second resistor connecting said second electrode to the other wire of the loop; voltage divider means connected between the wires of the loop, said voltage divider comprising a third resistor connecting said base electrode to the other wire and a Zener diode connecting said base electrode to the one wire, the junction between said diode and said third resistor being connected to said base electrode; a capacitor connected to said base electrode; a source of reference potential connected to said capacitor; and a source of interrogating signals and output means, both connected to said second terminal whereby the condition of said transistor regulates the flow of signals from said source of interrogating signals to said output means.

No references cited.